United States Patent [19]

Selden

[11] Patent Number: 4,478,611

[45] Date of Patent: Oct. 23, 1984

[54] METHOD OF MAKING TUNGSTEN CARBIDE GRIT

[75] Inventor: Gary F. Selden, Mt. Clemens, Mich.

[73] Assignee: Hughes Tool Company, Houston, Tex.

[21] Appl. No.: 103,720

[22] Filed: Dec. 14, 1979

[51] Int. Cl.³ ............................................... B24D 3/02
[52] U.S. Cl. ........................................ 51/307; 51/293; 51/309; 423/440
[58] Field of Search ........................ 75/240; 423/440; 51/293, 309, 307

[56] References Cited

U.S. PATENT DOCUMENTS

| | | | |
|---|---|---|---|
| 2,630,383 | 3/1953 | Schwartz et al. | 51/309 |
| 3,301,645 | 1/1967 | Smiley | 51/309 |
| 3,385,683 | 5/1968 | Williams | 51/293 |
| 3,515,524 | 6/1970 | Grambal | 51/307 |
| 3,744,979 | 7/1973 | Kalish | 51/307 |
| 3,765,300 | 10/1973 | Taylor et al. | 51/307 |

Primary Examiner—Donald E. Czaja
Assistant Examiner—W. Thompson
Attorney, Agent, or Firm—Hedman, Gibson, Costigan & Hoare

[57] ABSTRACT

A novel method is disclosed for preparing a tungsten carbide grit. The method comprises blending tungsten carbide powder with a binder, forming agglomerates of the powder and sintering the agglomerates to form the tungsten carbide grit.

6 Claims, No Drawings

METHOD OF MAKING TUNGSTEN CARBIDE GRIT

BACKGROUND OF THE INVENTION

This invention provides a novel method for the manufacture of tungsten carbide grit. Tungsten carbide grit is well known for use in hardfacing applications such as on rotary rock bits and tool joint connections that are used primarily in well drilling where tools must withstand severe abrasion and the stresses of high impacts. In the prior art, grits have been made by crushing and screening tungsten carbide compositions. This method produced sharp faceted, irregularly shaped particles with inferior wear resistance. In U.S. Pat. No. 3,385,683 it was recognized that the irregularly shaped grit obtained by crushing tungsten carbide compositions were subject to wear problems because of the points and pressures on the grits and the lack of uniformity in the grit particles. This patent teaches a method for preparing tungsten carbide powders whereby spheres, cylinders, ovoids or cubes of tungsten carbide can be obtained for use as hardfacing on tools. A disclosure of the use of a tumbling procedure is mentioned for the production of tungsten carbide grit but no mention is made as to how this procedure is to be carried out.

It has been discovered that if tungsten carbide powder is combined with a suitable organic binder and agglomerated into particles which are sintered to remove the binder and form a tungsten carbide grit, a grit with blunt, round particles is obtained. These blunt tungsten carbide grits are obtained in good yield with a minimum of unuseable fine material. The blunt tungsten carbide grit has superior wear resistance properties as compared to the tungsten carbide grit obtained by crushing tungsten carbide blocks or compacts.

DETAILED DESCRIPTION OF THE INVENTION

The invention is directed to a process for making tungsten carbide grit. The process comprises:
(a) blending a tungsten carbide powder with an organic binder to form a powdered mixture of tungsten carbide powder and organic binder;
(b) forming agglomerated particles of said powdered mixture of tungsten carbide powder and organic binder; and
(c) sintering said agglomerated particles to form tungsten carbide grit.

The tungsten carbide powder may be made of WC or $W_2C$ or of mixtures thereof in a binder of Fe, Co or Ni. The ratio of binder to tungsten carbide should be from about 0.3:10 to 0 5:10 by weight although the exact ratio is not critical in the practice of the present invention. Usually, the tungsten carbide powder will be of 100-325 mesh. All references to "mesh" as used herein refer to U.S. Standard Mesh.

The tungsten carbide powder is blended with an organic binder which aids in transforming the relatively fine tungsten carbide powder into a grit having a particle size of from 10-45 mesh. Suitable organic binders include polymethylmethacrylate, polyethylene, polypropylene and polystyrene.

The preferred binder is polymethylmethacrylate. The function of the binder is to aid in the formation of the agglomerated particles which, when sintered will have the particle size desired for the finished product.

From 1 to 5% by weight of organic binder, based on total weight of organic binder and tungsten carbide powder is utilized in the process of the invention.

The tumbling operation is carried out with the aid of a suitable organic solvent that is used in a quantity that is sufficient to cause the mixture of the organic binder and the tungsten carbide powder to agglomerate into particles that when sintered will be of from about 10 to about 45 mesh. The particular solvent is not critical and a useful solvent may be selected from the group consisting of acetone, ethylene dichloride, methylethylketone, or toluene.

The solvent may be applied to the agitated powders in the form of a spray or mist which will cause the powder to agglomerate. Once the powder agglomerates, the length and speed of the agitation cycle may be adjusted to obtain particles having the desired mesh size.

After the agglomeration step, the product may be screened to obtain a narrow size range that will enable the production of a uniform size product. If necessary the product may be dried before or after the screening step to remove any traces of the organic solvent.

A presintering step may be carried out in the presence of calcined alumina and a reducing atmosphere to remove the organic binder and obtain a product having some structural integrity. This presintering step should be carried out at a temperature that is high enough to remove the organic binder. Usually a temperature of from about 250° C. to about 700° C. that is applied for from about 3 hours to about 8 hours is sufficient. The presintering step should be controlled so that the resulting particles achieve sufficient structural integrity that they are self supporting and do not crumble when handled.

The sintering step may be carried out in a muffle furnace at a temperature of from about 1350° C. to about 1500° C. for a period of from about 20 min. to about 60 min. to obtain the tungsten carbide grit. After the sintering step, the grit may be screened to remove any fine particles.

DESCRIPTION OF THE PREFERRED EMBODIMENT

Tungsten carbide powder which was made from 91 wt % WC and 9 wt % cobalt finished grade powder and having a mesh of 200 is blended with 3 percent by weight of polymethylmethacrylate, based on total weight of tungsten carbide powder and polymethylmethacrylate (obtained from Fisher Chemical M-215). The blended powders are tumbled in a Baird type tumbler using an acetone spray in an amount that is sufficient to cause the powder to ball up. After the powder balls up the acetone spray is discontinued and the tumbling is continued until the bulk of the particles are approximately 16 mesh.

The tumbling is terminated and the particles are screened at 14-25 mesh to eliminate oversize or undersize particles and the particles are dried to remove acetone. The agglomerated particles are evenly dispersed in calcined alumina ($Al_2O_3$) in a 10" hydrogen atmosphere muffle furnace to remove the polymethylmethacrylate and impart structural integrity to the agglomerated particles. The presintered particles are then sintered in a 12" muffle furnace to obtain the tungsten carbide grit. A final screening may be carried out to remove any fine particles from the product. The conditions used in the process are as follows:

| | |
|---|---|
| Tumbling Speed | 30–32 RPM |
| Presintering Conditions | 625° C.; 8 hours |
| Sintering Conditions | 1485° C.; 45–60 min. (stoke rate ¾" minute) |
| Size of Grit Produced | 16–30 mesh (distribution) |
| | 30–45 mesh (distribution) |

Obviously many variations will suggest themselves to those skilled in the art from the above detailed description without departing from the scope or spirit of the invention. It is, therefore, to be understood that changes may be made in the particular embodiments of the invention as defined by the appended claims.

I claim:

1. A method for preparing a tungsten carbide grit which comprises:
   (a) blending a tungsten carbide powder with an organic binder to form a powdered mixture of tungsten carbide powder and organic binder;
   (b) forming agglomerated particles of said powdered mixture of tungsten carbide powder and organic binder; and
   (c) sintering said agglomerated particles to form tungsten carbide grit, wherein the organic binder is selected from the group consisting of polymethylmethacrylate, polyethylene, polypropylene and polystyrene.

2. A method as for preparing a tungsten carbide grit which comprises:
   (a) blending a tungsten carbide powder with an organic binder to form a powdered mixture of tungsten carbide powder and organic binder;
   (b) forming agglomerated particles of said powdered mixture of tungsten carbide powder and organic binder; and
   (c) sintering said agglomerated particles to form tungsten carbide grit, which includes a presintering step that comprises heating said agglomerated particles in the presence of calcined alumina until the organic binder is removed.

3. A method for preparing a tungsten carbide grit which comprises:
   (a) blending a tungsten carbide powder with a polymethylmethacrylate to form a powder mixture of tungsten carbide powder and polymethylmethacrylate;
   (b) tumbling said powder mixture of tungsten carbide powder and polymethylmethacrylate in the presence of an organic solvent to form agglomerated particles of said powdered mixture of tungsten carbide powder and polymethylmethacrylate;
   (c) heating said agglomerated particles in a presintering step to remove the polymethylmethacrylate;
   (d) sintering the agglomerated particles to form tungsten carbide grit.

4. A method as defined in claim 3 wherein the tungsten carbide powder is of 100–325 mesh.

5. A method as defined in claim 4 wherein the agglomerated particles are of 10–45 mesh.

6. A method as defined in claim 5 wherein the organic solvent is acetone.

* * * * *